United States Patent [19]

Yoshida

[11] Patent Number: 4,464,980
[45] Date of Patent: Aug. 14, 1984

[54] BELLOWS ACTUATOR

[75] Inventor: Hideo Yoshida, Fujinomiya, Japan

[73] Assignee: Nihon Plast Co., Ltd., Fuji, Japan

[21] Appl. No.: 272,530

[22] Filed: Jun. 11, 1981

[30] Foreign Application Priority Data

Jun. 19, 1980 [JP] Japan ................................. 55-83157

[51] Int. Cl.³ ........................................... F01B 19/04
[52] U.S. Cl. ...................................... 92/34; 264/506; 264/520
[58] Field of Search ............... 92/34, 47, 92; 264/506, 264/520

[56] References Cited

U.S. PATENT DOCUMENTS 3,319,532  5/1967  Pridham, Jr. ............................ 92/47
3,989,784 11/1976  Uhlig ................................... 264/520

Primary Examiner—Robert E. Garrett
Assistant Examiner—Richard S. Meyer
Attorney, Agent, or Firm—Armstrong, Nikaido, Marmelstein & Kubovcik

[57] ABSTRACT

A blow-molded bellows of a thermoplastic elastomeric material has a generally cylindrical hollow accordion-type convolution section and ends integral therewith. The ends has axial protrusions extending outwardly from the central areas of respective ends. Each protrusion is connected to an adjacent convolution by an integral shoulder which has inwardly concave portions and outwardly convex portions. The concave portions are adjacent to the parting line, whereas the convex portions are remote from the parting line. By this feature of the bellows, the outermost convolutions of the accordion-type convolution section of the bellows can be molded into circumferentially substantially uniform wall thickness to assure improved operability and heat-resistant property of the bellows.

6 Claims, 25 Drawing Figures

FIG. 24
FIG. 25
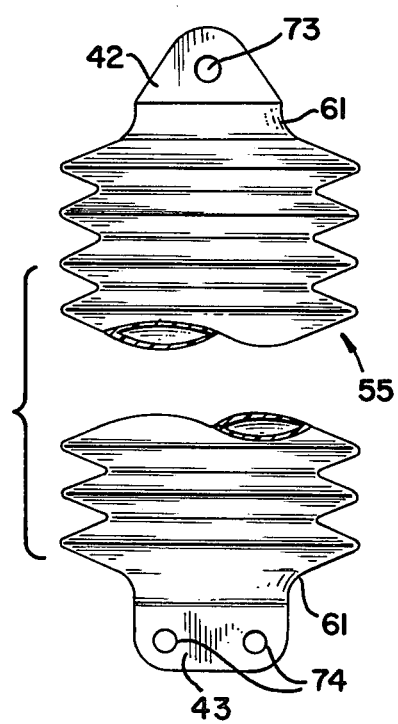
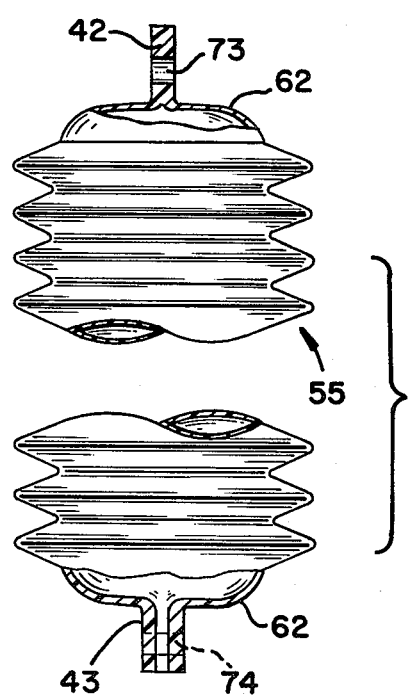

BELLOWS ACTUATOR

BACKGROUND OF THE INVENTION

1. Field of the Invention

The present invention relates to a bellows structure which is blow-molded from a parison of a thermoplastic elastomeric material in a mold cavity defined in a mold including at least two mold parts which are separable apart when parisons are placed in the mold.

2. Description of the Prior Art

Bellows elements have conventionally been used as actuators for devices such as a damper disposed in an air induction system of an automotive internal combustion engine. Each bellows has an accordion-type convolution section and is blow-molded from a parison of a thermoplastic elastomeric material. The opposite ends of the accordion-type convolution section are closed by end sections having axial protrusions integrally formed on and axially outwardly extending from the central areas of the end sections so as to be engaged with mechanical elements to be drivingly connected to the bellows member. The axial protrusions are connected to the opposite ends of the accordion-type end section by generally annular shoulder portions each having an outer surface which extends smoothly and continuously in the circumferential direction of the bellows. Due to this design of each annular shoulder portion of the prior art bellows member, there has been a problem which will be discussed in detail with reference to FIGS. 1 to 6 of the accompanying drawings.

BRIEF DESCRIPTION OF THE DRAWINGS

FIGS. 1 through 6 illustrate the prior art, wherein:

FIG. 1 is a fragmentary axial sectional view of a parison of a thermoplastic elastomeric material placed in a mold cavity and severed from the rest of the material;

FIG. 2 is an axial sectional view of the parison taken along line II—II in FIG. 1;

FIG. 3 is a cross-sectional view of the parison taken along line III—III in FIG. 1;

FIG. 4 is a cross-sectional view of the parison taken along IV—IV in FIG. 1;

FIG. 5 is an axial sectional view of a bellows which has just been blow-molded from the parison;

FIG. 6 is an axial sectional view of the bellows taken along line VI—VI in FIG. 5;

FIGS. 7 through 17 illustrate an embodiment of a bellows according to the present invention, wherein:

FIG. 7 is an axial sectional view of a parison of a thermoplastic elastomeric material placed in a mold cavity and severed from the rest of the material;

FIG. 8 is an axial sectional view of the parison taken along line VIII—VIII in FIG. 7;

FIG. 9 is a cross-sectional view of the parison taken along line IX—IX in FIG. 7;

FIG. 10 is a cross-sectional view of the parison taken along line X—X in FIG. 7;

FIG. 11 is a cross-sectional view of the parison taken along line XI—XI in FIG. 7;

FIG. 12 illustrates the axial section of the parison obtained at the initial stage of the blow-molding process;

FIG. 13 is an axial sectional view of the parison taken along line XIII—XIII in FIG. 12;

FIG. 14 illustrates the axial section of the parison obtained at the intermediate stage of the blow-molding process;

FIG. 15 is an axial sectional view of the parison taken along line XV—XV in FIG. 14;

FIG. 16 is an axial sectional view of a bellows according to the present invention which has just been blow-molded;

FIG. 17 is an axial sectional view of the bellows taken along line XVII—XVII in FIG. 16;

FIGS. 24 and 25 are partial sectional side elevations of the embodiment of the bellows of the present invention shown in and described with reference to FIGS. 7 through 17.

Referring to FIGS. 1 to 6 of the drawings which show the prior art, a tubular parison 1 of a thermoplastic elastomeric material extruded from an extruder (not shown) is inserted into a mold consisting of a pair of separable mold parts 2 and 3. When the mold is closed, the upper and lower end portions 1a and 1b of the parison 1 are severed from the rest of the material and, at the same time, pressed into flat protrusions, as best seen in FIGS. 1-3. Reference numeral 4 designates a parting line along which the two mold parts 2 and 3 abut each other. The parting line 4 extends along the side edges of the flat protrusions 1a and 1b (see FIGS. 2 and 6). The part 5 of the parison adjacent to the parting line 4 (i.e., adjacent to the side edge of each protrusion) is remote from the axis of the parison, whereas the part 6 of the parison remote from the parting line 4 (i.e., remote from the side edge of each protrusion) is relatively close to the axis of the parison. Thus, the distance L1 between the part 5 and the bottom 9 of an adjacent convolution-molding groove 8 in the mold is smaller than the distance L2 between the portion 6 and the bottom 10 of the convolution-molding groove 8. Accordingly, when air is introduced into the parison 1 through an air-blowing tube 7 to expand the parison into contact with the bottoms of the convolution-molding grooves 8 in the mold parts 2 and 3 as shown in FIGS. 5 and 6, the part 12 of the elastomeric material of the parison 1 which has reached the bottom 10 of the convolution-molding groove 8 is much more expanded and thinned as shown in FIG. 6 than the part 11 of the material of the parison which has reached the bottom 9 of the groove 8 as shown in FIG. 5.

Figure 1:
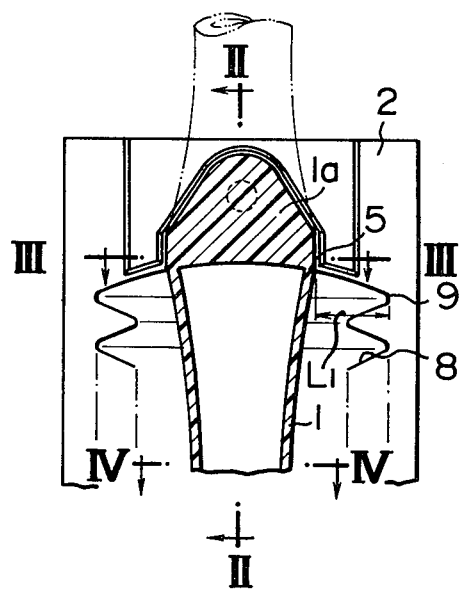
Figure 2:
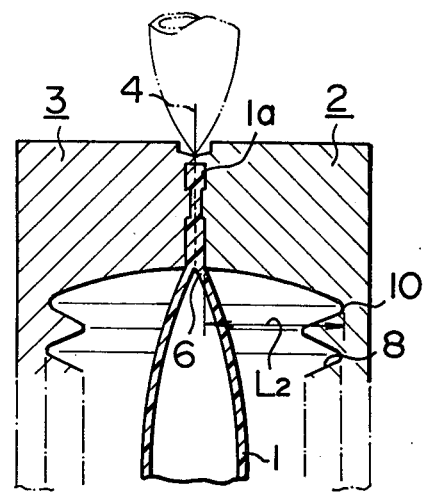
Figure 3:
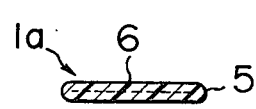
Figure 4:
Figure 5:
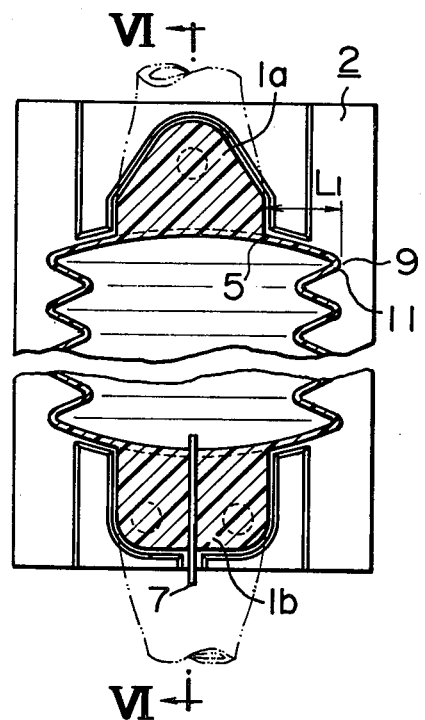
Figure 6:
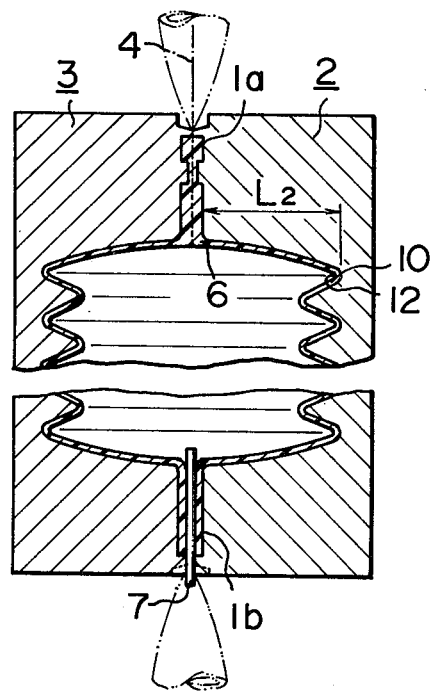

Thus, when the bellows is used as a vacuum actuator and repeatedly collapsed and expanded in a high temperature environment, the thinned wall portion 12 is incapable of self-supporting its initial shape and tends to be inwardly buckled and folded. In order to prevent such an inward buckling and folding, the wall thickness of the parison must be increased to increase the thickness of the wall portion 12 of the bellows. However, the increase in the wall thickness of the parison results in the increase in the wall thickness of the portion 11 of the bellows, which lowers the operability of the bellows.

As discussed above, the prior art accordion-type bellows has the problem of irregular wall thickness due to circumferentially different blow ratios of the thermoplastic elastomeric material of the parison in the shoulders between the axial protrusions and the axially opposite ends of the accordion-type convolution section. This irregular wall thickness adversely affects the self-supporting characteristic of the bellows. Moreover, another design to assure the self-supporting characteristic of the bellows lowers the operability of the bellows.

SUMMARY OF THE INVENTION

It is an object of the present invention to provide an improved bellows structure in which even the outermost convolution of the accordion-type convolution section has a substantially uniform wall thickness in the circumferential direction of the bellows to provide improved operability and heat-resistant property.

According to the present invention, there is provided a bellows blow-molded from a parison of a thermoplastic elastomeric material in a mold cavity defined in a mold including at least two mold parts which can be separated apart when parisons are placed in the mold; said bellows comprising:

a generally cylindrical hollow accordion-type convolution section including a plurality of convolutions for causing the axial dimension of the bellows to be changed when the interior of the bellows is subjected to a variation in fluid pressure; and end sections integral with the opposite ends of said accordion-type convolution section, respectively;

at least one of said end sections having an axial protrusion integrally formed on and axially outwardly extending from the central area of said one end section, and a shoulder interconnecting said protrusion and the convolution disposed at one of the ends of said accordion-type convolution section;

said shoulder including a first portion adjacent to a parting line and a second portion remote from the parting line, said first portion being concave as viewed from outside the bellows, said second portion being convex as viewed from outside the bellows.

DESCRIPTION OF PREFERRED EMBODIMENTS

An embodiment of the present invention will now be described with reference to FIGS. 7-17 of the drawings.

Mold parts 21 and 22 which form a blow-molding mold have inner surfaces in which similar grooves are formed symmetrically with respect to a parting line 23. More specifically, the opposed inner surfaces of the mold parts 21 and 22 are formed therein with relief grooves 24 and 25, respectively, adjacent to the opposite ends of the mold parts. Protrusion-molding recesses 28 and 29 are formed in each of the mold parts 21 and 22 inwardly of the relief grooves 24 and 25, respectively. Nipping or biting lines 26 and 27 are provided between the relief grooves 24 and 25 and the protrusion-molding recesses 28 and 29, respectively. A plurality of parallel convolution-molding grooves 31 are formed in the inner surface of each mold part between the protrusion-molding recesses 28 and 29. Each of the grooves 31 is semicircular in cross-section. The convolution-molding grooves 31 and the protrusion-molding recesses 28 and 29 in both mold parts 21 and 22 cooperate together to define a mold cavity.

Figure 7:
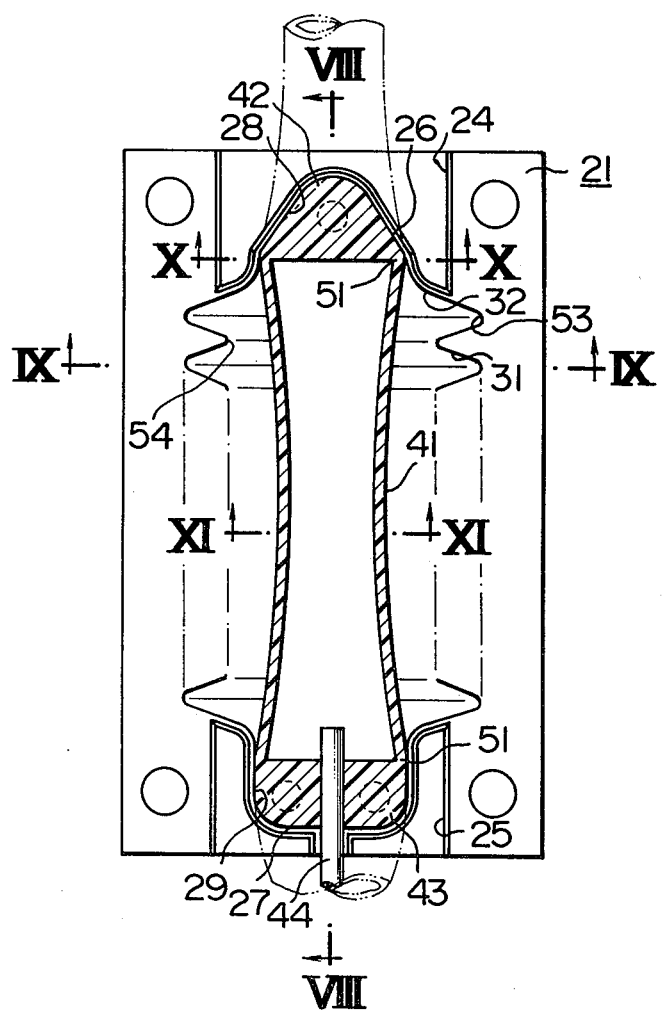
Figure 8:
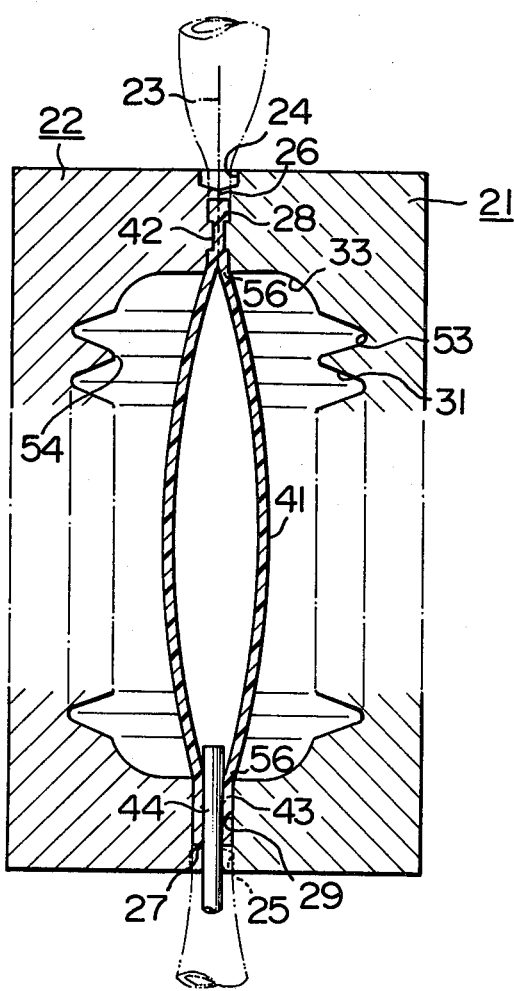
Figure 9:
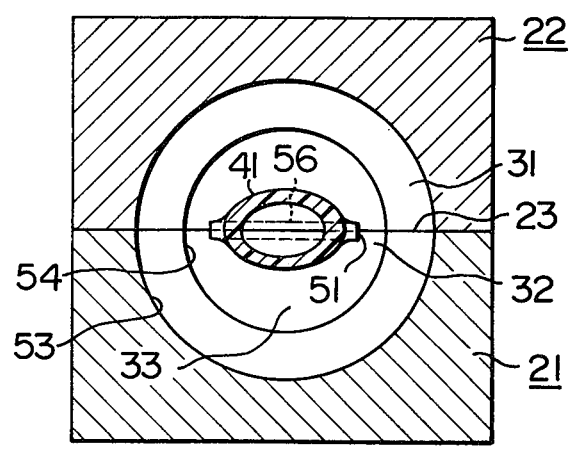
Figure 10:
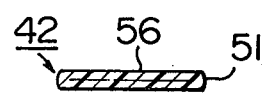
Figure 11:
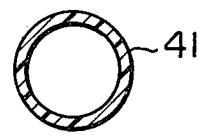

That part 32 of the inner surface of the mold cavity which is close or adjacent to the parting line 23, namely, that inner surface portion of the mold cavity which is adjacent to the edge of the opening of the outermost convolution-molding groove 31 in each mold part, is convex, as will be seen in FIG. 7. On the other hand, that part 33 of the inner surface of the mold cavity which is remote from the parting line 23, namely, the inner surface portion of the mold cavity which is disposed between the bottom of each of the protrusion-molding recesses 28 and 29 and the central portion of the adjacent convolution-molding groove 31 in each mold part is concave, as will be seen in FIG. 8.

The mold parts 21 and 22 are separated apart to open the mold to receive a parison 41 of a thermoplastic elastomeric material in the mold cavity. The mold is then closed to sever the parison 41 from the continuous length of parison of the plastic material by means of the biting lines 26 and 27. At the same time, the material is pressed in the protrusion-molding recesses 28 and 29 to form generally flat axial protrusions 42 and 43 which are integral with the central part of the parison 41 in the mold cavity. Before the mold is closed to mold the protrusions 42 and 43, an air-blowing tube 44 is placed in the opening in the bottom end of the parison 41 so that the tube 44 is embedded in the lower protrusion 43 when the mold parts are moved into abutment engagement with each other. Respective sections of the parison 41 obtained when the mold is closed are shown in FIGS. 7 to 11.

The preferred material of the parison 41 is polyester elastomer, polyolefin elastomer, polyurethane elastomer or soft polyamide. Polyolefin elastomer is most preferred.

Figure 12:
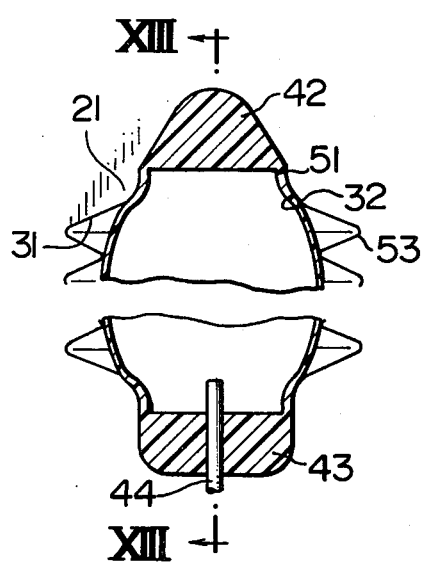
Figure 13:
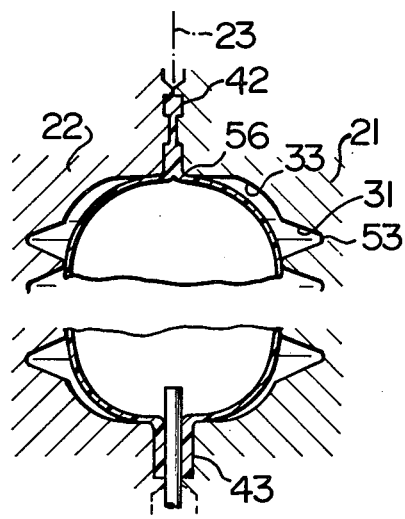
Figure 14:
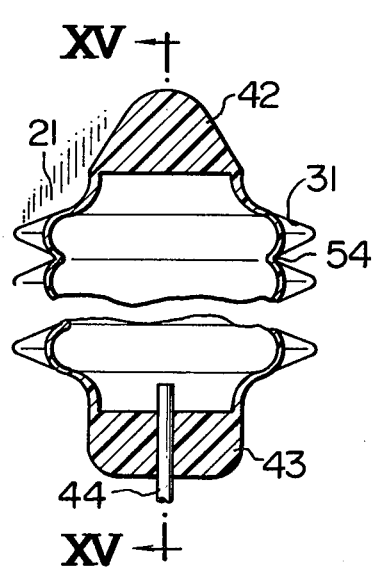
Figure 15:
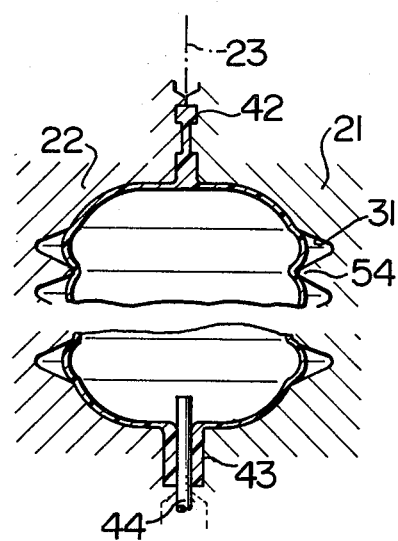
Figure 16:
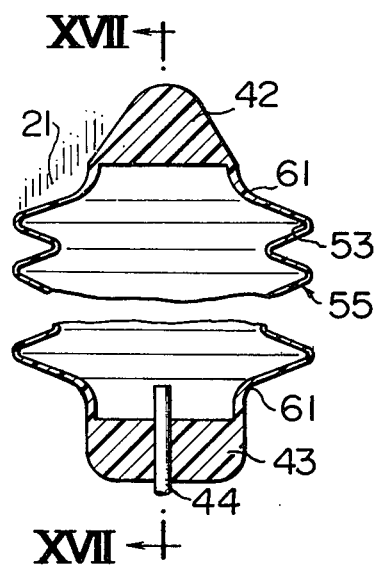
Figure 17:
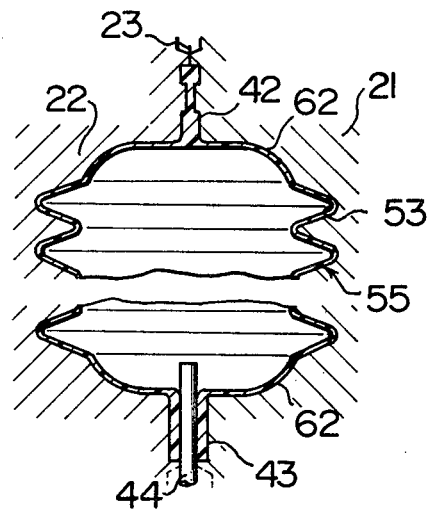

When air is introduced through the tube 44 into the parison 41, it is expanded radially outwardly first to the shape shown in FIGS. 12 and 13, then to the shape shown in FIGS. 14 and 15 and finally to the shape shown in FIGS. 16 and 17.

It has been a common knowledge in the art that, in the shoulder sections which interconnect the protrusions 42 and 43 and the opposite ends of the generally cylindrical accordion-type convolution section, the part 51 of the material which is adjacent to the parting line 23 and is remote from the axis of the parison and relatively near to the bottom 53 of the outermost convolution-molding groove 31 is expanded at a blow ratio smaller than the blow ratio of the parison at its central section and the latter blow ratio is smaller than the blow ratio of the parison at the part 56 which is remote from the parting line 23 and close to the axis of the parison, thus the blow ratio of the part 56 being largest. Thus, the elastomeric material at this part 51 has been known to provide a relatively thick wall when expanded into the bottom 53 of the groove 31. However, because the mold parts 21 and 22 for molding the bellows according to the present invention are provided with convex inner surface portions 32 adjacent to the parting line 23, the elastomeric material of the parison adjacent to the portion 51 is contacted with and cooled by the inner mold surface portions 32 at the initial stage of expansion process, as shown in FIG. 12. Accordingly, the material of the parison adjacent to the mold surface portions 32 is solidified more quickly than the rest of the material of the parison. For this reason, the part of the material present radially outwardly of the mold surface portions 32 is greatly reduced and, when the material is expanded to a diameter greater than the inner diameter of the crest 54 of the convolution-molding groove 31, the material is stretched to a relatively small wall-thickness, as shown in FIG. 14. The material is further expanded radially outwardly into the bottoms of the convolution-molding grooves 31 to thereby form a generally cylindrical accordion-type convolution section 55.

On the other hand, it has also been a common knowledge in the art that, in the shoulder sections interconnecting the protrusions 42 and 43 and the accordion-type convolution section 55, the part 56 of the material of the parison which is remote from the parting line 23 is closer to the axis of the parison and thus more remote from the bottom 53 of the convolution-molding groove 31 than the part 51 of the parison. Thus, the material of the parison adjacent to this part 56 is expanded at the largest blow ratio. Accordingly, it has been known that this part 56 is stretched into a thin-walled section when it is expanded to the bottom 53 of the convolution-molding groove 31. However, because the mold parts 21 and 22 for molding the bellows according to present invention are provided with concave inner surface portions 33 at portions remote from the parting line 23, the part 56 of the material of the parison is not contacted with the inner mold surface portions 33 and thus is not cooled thereby at the initial stage of the expansion process, as shown in FIG. 13. Thus, the elastomeric material when it is expanded to a diameter greater than the diameter of the crest 54 of the convolution-molding groove 31 as shown in FIG. 15 is not thin-walled so much and is generally as thick as the wall shown in FIG. 14. Finally, the material is expanded into the bottoms 53 of the grooves 31 to form the generally cylindrical accordion-type convolution section 55.

It will be understood, therefore, that each of the shoulder sections interconnecting the axial protrusions 42 and 43 and the opposite ends of the cylindrical accordion-type convolution section 55 of a bellows thus blow-molded according to the present invention has concave portions 61 adjacent to the parting line 23 and convex portions 62 remote from the parting line 23, as best seen in FIGS. 16 and 17. These concave and convex portions 61 and 62 as viewed in the axial direction of the bellows are disposed on each end of the bellows at angular intervals of 90° and are connected with each other by smoothly curved surfaces.

It will be seen from the foregoing description that even the axially outermost convolutions of the accordion-type convolution section of the bellows according to the present invention has a substantially uniform wall thickness in the circumferential direction of the bellows. Accordingly, when the bellows is used as an actuator, it provides improved operability and heat-resistant property.

Figure 18:
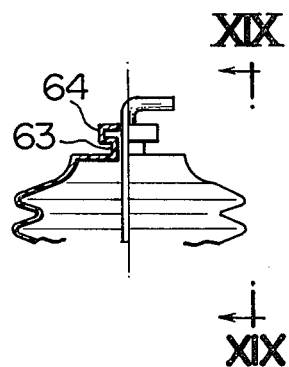
FIG. 18 is a partly sectional and partly elevational fragmentary view of another embodiment of the bellows according to the present invention.
Figure 19:
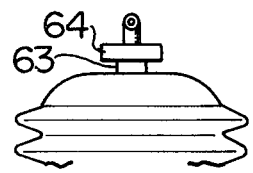
FIG. 19 is a fragmentary side elevational view of the bellows of FIG. 18 taken along line XIX—XIX in FIG. 18.
Figure 20:
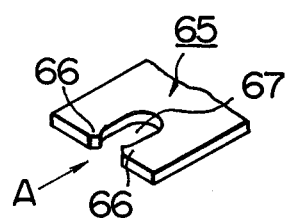
FIG. 20 is a fragmentary perspective view of a mechanical element to be coupled to the protrusion of the bellows shown in FIGS. 18 and 19.

In the embodiment of the invention described above, the protrusions 42 and 43 are flat and provide axially extending parallel major surfaces and narrow side faces or edges along which the parting line 23 extends. However, the protrusions may alternatively be of circular cross-section, as shown in FIGS. 18 and 19. Namely, the protrusion shown in FIGS. 18 and 19 is hollow and comprises cylindrical smaller diameter portion 63 and larger diameter portion 64. The smaller diameter portion 63 is adapted to be drivingly connected to a mechanical element 65 in such a manner that the portion 63 is moved in a direction indicated by an arrow A in FIG. 20 and urged against a pair of opposed resilient lips 66 to resiliently outwardly deform or separate the lips away from each other until the portion 63 of the protrusion is snapped in a notch or opening 67 formed in the mechanical element 65 inwardly of the lips 66.

Figure 21:
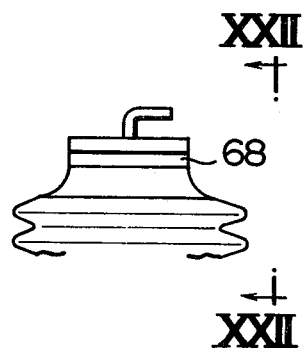
FIG. 21 is a fragmentary elevational view of a further embodiment of the bellows according to the present invention.
Figure 22:
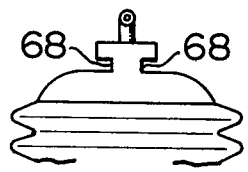
FIG. 22 is a fragmentary elevational view of the bellows of FIG. 21 taken along line XXII—XXII in FIG. 21.
Figure 23:
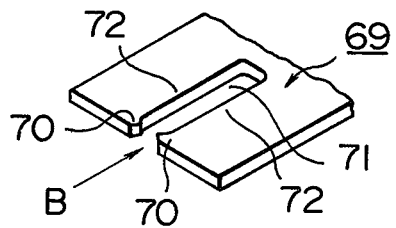
FIG. 23 is a fragmentary perspective view of a mechanical element to be coupled to the protrusion of the bellows shown in FIGS. 21 and 22.

The flat protrusions of the bellows may be provided with transverse grooves 68 for engagement with a mechanical element to be connected to the bellows, as will be seen in FIGS. 21 and 22. In this modification, the protrusion is moved in a direction indicated by an arrow B in FIG. 23 and urged against a pair of resilient lips 70 on a mechanical element 69 to resiliently and outwardly deform or laterally separate the lips away from each other until the grooved portion of the protrusion of the bellows is snapped into an elongated notch 71 in the mechanical element and engaged with the side edges 72 of the notch.

Further, alternatively, the flat protrusions may be provided with openings 73 and 74, respectively, for engagement with mechanical elements to be connected to the bellows, as shown in FIGS. 24 and 25. The openings 73 and 74 can easily be formed in the protrusions by punching or drilling them.

What is claimed is:

1. A bellows blow-molded from a parison of a thermoplastic elastomeric material in a mold cavity defined in a mold including at least two mold parts which can be abutted or separated apart when parisons are placed in the mold, the line of abutment forming a parting line between the mold parts; said bellows comprising:
   a hollow accordion-type convolution section, including a plurality of convolutions lying between axially opposite ends of said convolution section, for causing the axial dimension of the bellows to be changed when the interior of the bellows is subjected to a variation in fluid pressure; and
   end sections integral with the opposite ends of said accordion-type convolution section, respectively;
   at least one of said end sections having an axial protrusion integrally formed on and axially outwardly extending from the central area of said one end section, and a shoulder interconnecting said protrusion and the convolution disposed at one of the ends of said accordion-type convolution section;
   said shoulder having circumferentially alternating concave and convex portions located along a cross-section defined by a plane perpendicular to the longitudinal axis of the bellows, the center of each portion being generally 90 degrees apart from its adjacent portion.

2. A bellows according to claim 1, wherein said protrusion is substantially flat and provides side edges, and wherein said parting line extends along said side edges.

3. A bellows according to claim 2, wherein said flat protrusion is formed therein with at least one opening for engagement with a mechanical element to be drivingly connected to said bellows.

4. A bellows according to claim 2, wherein said flat protrusion is provided with at least one groove formed in a surface thereof for engagement with a mechanical element to be connected to said bellows.

5. A bellows according to claim 1, wherein said protrusion is provided with an annular groove formed in the peripheral surface of said protrusion, said groove being adapted to be engaged with a mechanical element to be connected to said bellows.

6. A bellows according to claims 1, 2, 3, 4, or 5, wherein said bellows is of the type that is axially collapsible when subjected to a vacuum.

* * * * *